W. PERRY & A. S. JONES.
SPRING DRIVE OR POWER SHAFT COUPLING.
APPLICATION FILED OCT. 24, 1910.
1,024,020.
Patented Apr. 23, 1912.
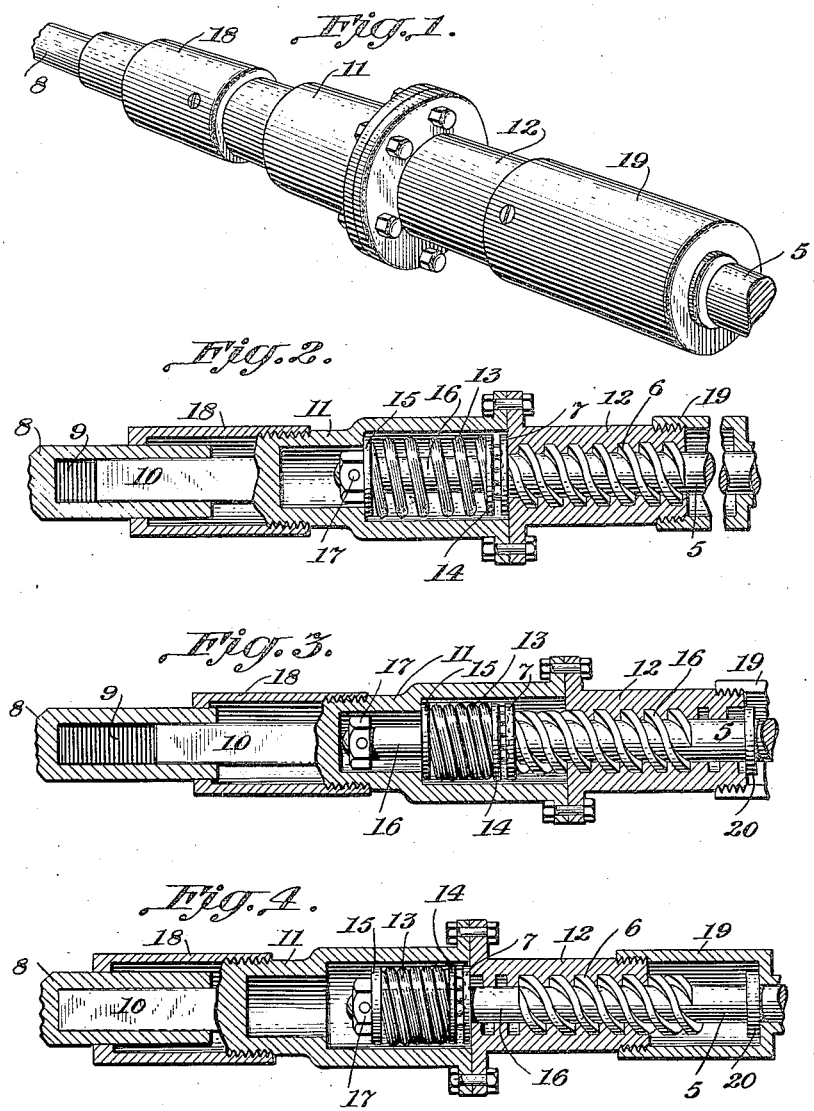

UNITED STATES PATENT OFFICE.

WILLIAM PERRY AND ALBAN SHORT JONES, OF GARDEN HILL WOLLONGONG, NEW SOUTH WALES, AUSTRALIA, ASSIGNORS TO THE HELI-CUSHION DRIVE LIMITED, OF SYDNEY, AUSTRALIA.

SPRING DRIVE OR POWER SHAFT COUPLING.

1,024,020.   Specification of Letters Patent.   Patented Apr. 23, 1912.

Application filed October 24, 1910. Serial No. 588,878.

*To all whom it may concern:*

Be it known that we, WILLIAM PERRY and ALBAN SHORT JONES, subjects of the King of Great Britain, residing at Garden Hill Wollongong, in the State of New South Wales and Commonwealth of Australia, have invented a new and useful Improved Spring Drive or Power Shaft Coupling, of which the following is a specification.

This invention relates to a coupling for connecting the driving end of a power shaft to the driven end of same in such a way that the power will be transmitted elastically and without shock to such driven end, and in motion all shocks and jerks will be minimized. And this invention though useful for the transmission in a direct line of driving power is especially adapted for connecting up the propeller or Cardan shaft of automobiles.

The general objects of the present invention are strength, simplicity, durability, compactness and inexpensiveness of construction; and effectiveness of operation.

One of the more particular objects of the invention is to devise a construction having a small number of parts and in which a single spring may be employed for cushioning the drive equally well in either direction of rotation.

Other objects and advantages of the invention will hereinafter appear.

The invention includes a coupling member having screw-threaded engagement with one shaft but mounted to rotate with while having a longitudinally-sliding connection with another alined shaft, the coupling member carrying a spring which is arranged to receive and resiliently transmit rotative driving strain or torque in either direction of rotation from one to the other of the alined shafts, the tension of the spring being increased by screw movement in either direction between the screw-threaded shaft and the coöperative coupling member.

This improved spring drive or power shaft coupling more particularly comprises four main parts: (*a*) a screw thread or threads on the one end of a shaft, say the driving shaft, (*b*) corresponding female screw threads in a coupling member part or screw box connected to the meeting shaft, or driven shaft, (*c*) a helical spring in a second coupling member part or spring containing box connected to the meeting or driven shaft and receiving the thrust between the driving and driven shafts, and (*d*) a slidable non-revolving connection of the screw and spring boxes to the said driven shaft.

The invention also includes other features of construction and combinations of parts, as will appear from the following description. But in order that this invention may be clearly understood the same will now be described in detail with reference to the drawings, accompanying and forming part of this complete specification and illustrating this improved spring drive or power shaft coupling, especially suitable for insertion in the propeller or Cardan shaft of a motor car.

Figure 1 shows the drive or coupling complete in perspective. Fig. 2 is a longitudinal section of the same in normal position, and Figs. 3 and 4 are similar views in the go-ahead and go-a-stern starting positions respectively.

The driving shaft 5 has on its end a plural or compound thread male screw 6 and bears against a ball bearing disk 7, while the driven shaft 8 has a square or other suitable orifice 9 adapted to receive a corresponding squared projection 10 on the spring box 11 (although this arrangement might be reversed) to which is bolted or otherwise affixed the screw box or nut or female threaded member 12, in which the male screw 6 is adapted to travel, these two parts constituting a tubular coupling member. The helical compression spring 13 bears against a disk 14 with a ball bearing between said disk 14 and the disk 7 and also bears against a disk 15 abutting against a shoulder of its box 11, the adjacent end of the screw-box 12 forming a similar opposed shoulder for the disk 7. The disk 15 is retained and the tension of the spring is secured by a nut 17 on a stem 16 projecting from the driving shaft 5 beyond the screw 6. Dust covers 18 and 19 are preferably used as shown.

Though not an essential to the success of the invention a stop collar 20 is carried by the shaft 5 and has abutment, on the turning of the shaft 5, against the end of the screw box 12 in one direction and against the end of the dust cover 19 in the opposite direction of revolution, and thereby relieves the spring against excessive compression.

In operation when power is applied to shaft 5 as in starting a car, the screw 6 travels along the boxes 11 and 12 either from or toward the shaft 8, according to the direction of drive, in either case compressing the spring 13 (see Figs. 3 and 4) but not farther than stop collar 20 will allow and so allowing the motion of said shaft 5 to be communicated gradually and without shock, and elastically, to the shaft 8. And as one or other of the shafts 5 and 8 might overrun or retard on the other the spring will likewise be compressed and take up without shock or jerk, and elastically, the difference in speed.

Having now fully described and ascertained our said invention and the manner in which it is to be performed, we declare that what we claim is:—

1. A rotatively cushioning shaft coupling comprising alined shafts, a coupling member having movable screw-threaded connection with one of the shafts and mounted to slide along and to rotate with the other shaft, and a spring coöperative with the screw-threaded shaft and with the coupling member and arranged to receive and to resiliently transmit the rotative driving strain in either direction of rotation of the rotatively coupled shafts.

2. A rotatively cushioning shaft coupling comprising alined shafts, a coupling member having movable screw-threaded connection with one of the shafts and mounted to slide along and to rotate with the other shaft, a spring coöperative with the screw-threaded shaft and with the coupling member, and means for increasing the tension of the spring by reason of screw movement in either direction between the screw-threaded shaft and the coupling member.

3. A rotatively cushioning shaft coupling comprising an externally screw-threaded shaft, an internally screw-threaded tubular member movably receiving the screw-threaded shaft, a compression spring surrounding the shaft within the tubular member, abutment stops on the shaft confining the spring, the tubular member having abutment shoulders also confining the spring, whereby screw movement between the shaft and the tubular member in either direction will compress the spring, and a second shaft in alinement with the first and rotatively connected to the tubular member.

4. A rotatively cushioning shaft coupling comprising alined shafts one of which is externally screw-threaded, a two-part tubular coupling member having internal opposed shoulders and one of the parts having internal screw threads movably receiving the external screw threads of the screw-threaded shaft and the other part constituting a spring-containing box, means for rigidly securing together the parts of the coupling member, a spring-receiving stem projecting beyond the screw-threaded portion of the screw-threaded shaft and into the spring-containing box, spring-limiting abutments carried by the stem, a coiled thrust spring surrounding the stem and coöperative with the abutments and with the opposed shoulders so as to be compressed by screw movement in either direction between the screw-threaded shaft and the screw-threaded part of the coupling member, and means for connecting the spring-containing box and the other shaft to rotate together and to relatively slide longitudinally to provide for the thrust of the screw in compressing the spring.

5. A rotatively cushioning shaft coupling comprising alined shafts, a tubular coupling member having movable screw-threaded connection with one of the shafts and mounted to slide along and to rotate with the other shaft, a spring coöperative with the screw-threaded shaft and with the coupling member and arranged to receive and to resiliently transmit the rotative driving strain in either direction of rotation of the rotatively coupled shafts, a dust cover carried by each end of the coupling member and protecting the joints between the shafts and the coupling member, and a stop carried by the screw-threaded shaft and coöperative with the adjacent end of the coupling member and the corresponding dust cover to limit the tension of the spring.

In testimony whereof we have signed our names to this specification in the presence of two subscribing witnesses.

WILLIAM PERRY.
ALBAN SHORT JONES.

Witnesses:
PERCY NEWELL,
D. EDWARDS.